United States Patent [19]

Ries

[11] E Re. 30,381

[45] Reissued Aug. 26, 1980

[54] FLEXIBLE ROTARY COUPLING

[75] Inventor: Donald L. Ries, Dearborn Heights, Mich.

[73] Assignee: Rockwell International Corporation, Pittsburgh, Pa.

[21] Appl. No.: 926,161

[22] Filed: Jul. 19, 1978

Related U.S. Patent Documents

Reissue of:

[64] Patent No.: 4,051,784
Issued: Oct. 4, 1977
Appl. No.: 676,087
Filed: Apr. 12, 1976

[51] Int. Cl.[2] ..... B61C 9/34; B61C 9/57; F16D 3/04; F16D 3/62

[52] U.S. Cl. ..... 105/131; 64/12; 64/27 R; 74/68; 105/117; 105/132; 105/132.1

[58] Field of Search ..... 64/12, 19, 21, 31, 37; 74/67, 68; 105/109, 117, 118, 131, 132, 132.1, 133, 135, 136

[56] References Cited

U.S. PATENT DOCUMENTS

| | | | |
|---|---|---|---|
| 268,807 | 12/1882 | Landis | 64/19 |
| 567,580 | 9/1896 | Bagnall | 64/19 X |
| 849,432 | 4/1907 | Sperry | 105/109 X |
| 1,752,138 | 3/1930 | Ainsworth | 64/19 |
| 1,970,174 | 8/1934 | Kaltenbach | 105/118 X |
| 2,181,888 | 12/1939 | Gustin | 64/12 |
| 2,292,675 | 8/1942 | Thiry | 64/12 X |
| 3,238,744 | 3/1966 | Camossi | 64/12 |
| 3,242,694 | 3/1966 | Schmidt | 64/19 X |
| 3,626,862 | 12/1971 | Korn et al. | 105/131 |
| 3,661,096 | 5/1972 | Kayserling | 105/117 |
| 3,791,170 | 2/1974 | Schmidt | 64/19 |
| 3,830,166 | 8/1974 | Dieling et al. | 105/131 |

FOREIGN PATENT DOCUMENTS

| | | | |
|---|---|---|---|
| 293477 | 10/1971 | Austria | 105/131 |
| 1253524 | 11/1967 | Fed. Rep. of Germany | 105/131 |
| 1503026 | 9/1970 | Fed. Rep. of Germany | 105/132 |
| 1303389 | 5/1972 | Fed. Rep. of Germany | 105/132 |
| 2353256 | 5/1975 | Fed. Rep. of Germany | 105/131 |
| 969410 | 12/1950 | France | 105/131 |
| 696378 | 8/1953 | United Kingdom | 64/19 |
| 872550 | 7/1961 | United Kingdom | 64/19 |
| 1180374 | 2/1970 | United Kingdom | 105/132 |

*Primary Examiner*—John J. Love
*Assistant Examiner*—Howard Beltran

[57] ABSTRACT

A coupling comprising first and second members adapted to be connected respectively to a rotary drive and a rotary driven means subject to displacement from its normal axis of rotation. An elongate member is located intermediate the first and second members and drivingly connected to each member by a plurality of links and connecting pins. Each link includes a pair of connecting pins extending in the same axial direction away from the link. One pin of each link is secured to a flange at one end of the intermediate member, the other pin being secured to a flange of the first or second member at that end of the intermediate member. The links are provided adjacent the side of the flanges opposite one of the first or second rotary members to reduce the angular displacement required of the connecting link pins to accommodate axial displacement of a given distance and to provide a structure in which the elements may be readily assembled and disassembled.

8 Claims, 3 Drawing Figures

FLEXIBLE ROTARY COUPLING

Matter enclosed in heavy brackets [ ] appears in the original patent but forms no part of this reissue specification; matter printed in italics indicates the additions made by reissue.

BACKGROUND OF THE INVENTION

The present invention is directed to a coupling and, more specifically, to a flexible drive coupling for a self-powered rail type of mass transit vehicle.

Flexible drive couplings connecting a shaft to a rotary driving member in which the shaft and the axis of rotation of the rotary driving member are normally in axial alignment but capable of being axially misaligned are known. Drive couplings of the type to which the present invention is directed which have been proposed for use in transit vehicles are disclosed in U.S. Pat. No. 567,560 to E. J. Bagnall and U.S. Pat. No. 3,661,096 to U. Kayserling. Flexible drive couplings are also disclosed in U.S. Pat. No. 268,807 to F. F. Landis, and U.S. Pat. Nos. 3,242,694 and 3,791,170 to R. Schmidt.

SUMMARY OF THE INVENTION

The coupling of the present invention comprises a first member adapted to be connected to a rotary driving means, a second member adapted to be connected to a driven means, an elongate member intermediate the first and second members and means drivingly connecting the first and second members respectively to opposite ends of the intermediate member. The means connecting at least one of the members to its respective end of the intermediate member comprises a plurality of links and connecting pins with each link having a pair of connecting pins extending in the same direction away from the link and with one connecting pin of each link secured to a radial extension provided to that member and the other connecting pin secured to a radial extension provided at that end of the intermediate member. In the embodiment to be disclosed below, a pair of diametricaly opposed radially extending arms are provided at each end of the elongate intermediate member. The first and second members are each respectively provided with a pair of diametrically opposed radially extending arms which are connected by links and connecting pins to the adjacent arms of the intermediate member with the links connecting the first member to the intermediate member positioned adjacent the side of the intermediate member arms opposite from the first member. In the disclosed embodiment the links connecting the second member to the intermediate member are also positioned adjacent the side of the intermediate member arms opposite from the first member. In the preferred embodiment the diametrically opposed arms at each end of the intermediate member are oriented substantially normal to each other and a pair of links are each secured at one end to each radially extending arm of the intermediate member and at the other ends to the radially extending arms of the first or second member at that end of the intermediate member.

The coupling of the present invention is capable of transmitting torque at high rotational speeds while permitting substantial misalignment between the axes of rotation of the rotary driving and driven means. The coupling is relatively compact and due to the particular arrangement of the members, connecting links and pins, provides for ease of assembly and disassembly as well as providing for increased length of the intermediate member which reduces the angular displacement required of the connecting link pins to accommodate axial displacement of a given distance and thus reduces stress between the connecting links and pins. These and other objects and advantages of the present invention will become apparent from the following description of the accompanying drawings.

BRIEF DESCRIPTION OF THE DRAWINGS

In the drawings wherein like reference numerals refer to like parts.

DESCRIPTION OF THE INVENTION

Figure 1:
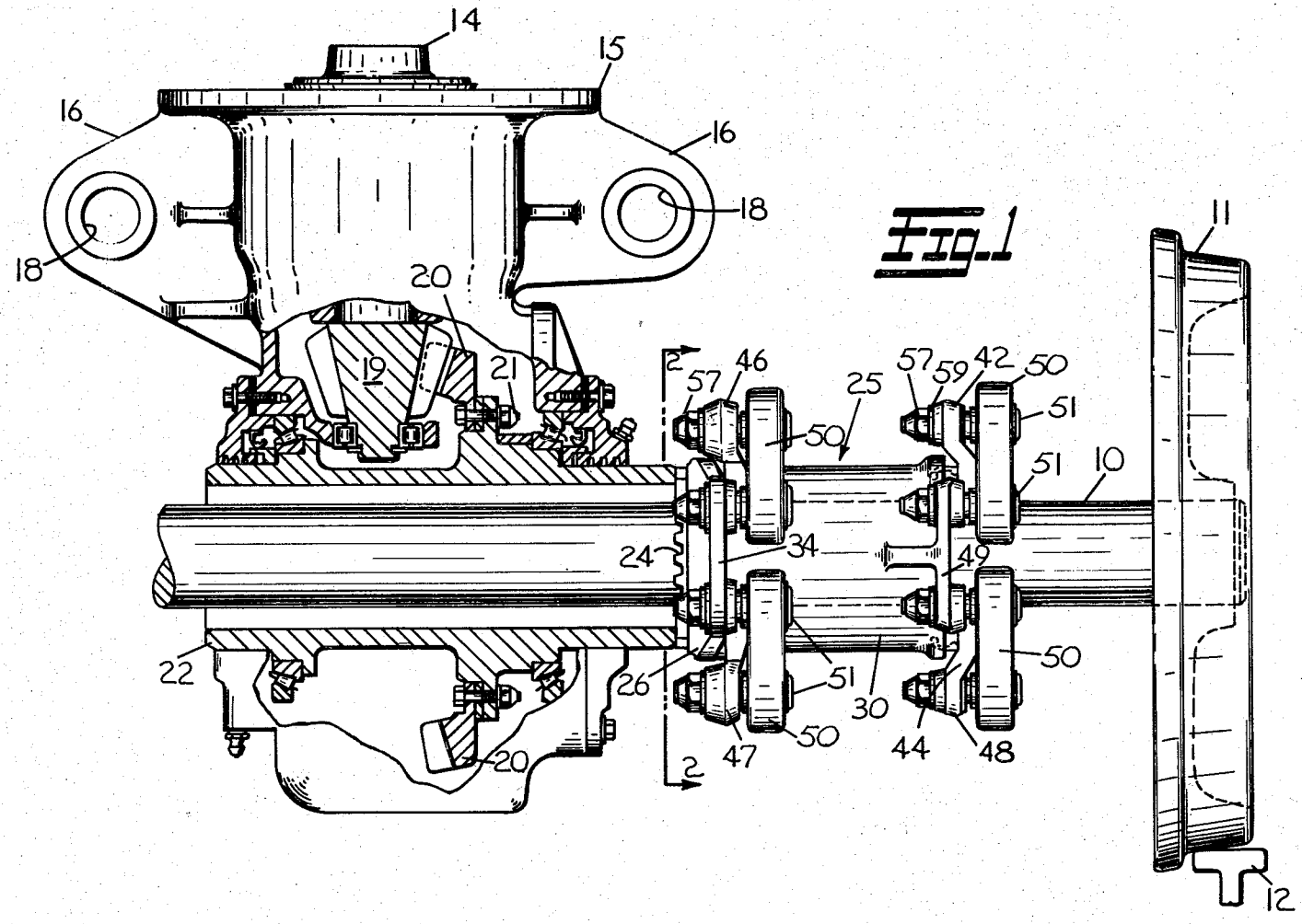
FIG. 1 is a plan view partly in section of a drive axle assembly for a steel wheeled transit vehicle.

With reference to the drawings, there is shown in FIG. 1 a drive axle assembly for a transit vehicle comprising an axle 10 fitted at its opposite ends with a pair of steel wheels 11 only one of which is shown riding on a rail 12. The wheels 11 are fixed at the opposite ends of the axle 10 to be driven thereby on the rails. The axle 10 is rotatably mounted in bearings, not shown, which in turn may be supported in conventional manner by means of a car truck secured to the under carriage of the rail vehicle per se. The drive assembly of FIG. 1 is preferably driven by an electric motor rigidly supported by the car truck with the output shaft of the motor drivingly engaging the rotary input 14 of a gear box 15.

The cast housing of the gear box 15 provides a pair of oppositely disposed ears 16 having apertures 18 which are used to rigidly secure the gear box housing to the car truck.

The rotary input 14 of gear box 15 drives a pinion gear 19 the axis of rotation of which is substantially normal to the axis of rotation of the axle 10. The teeth of the pinion gear 19 mesh with the teeth of a ring gear 20. The ring gear 20 is secured by means of a plurality of machine bolts 21 to a sleeve 22. The sleeve 22 is mounted by means of a plurality of tapered roller bearings provided internally of the gear box housing to permit relatively friction free rotation of the ring gear 20 and sleeve 22 about an axis substantially normal to the axis of rotation of the pinion gear 19. The axially facing annular end of the sleeve 22 shown to the right in FIG. 1 is provided with a plurality of teeth 24 which serve as a rotary driving input to the coupling 25.

Figure 2:
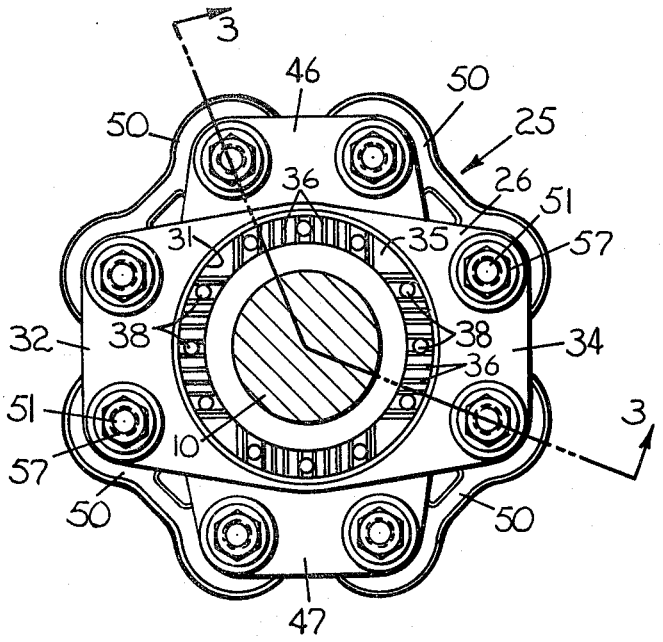
FIG. 2 is an end view of the coupling taken along the line 2—2 of FIG. 1.

Coupling 25 is comprised of a first rotary member 26, a second rotary member 28 and an elongate intermediate member 30. The rotary member 26 as best shown in FIG. 2 has a hollow hub like interior portion 31 and a flange provided in the form of two oppositely disposed radially extending arms 32 and 34. The annular surface 35 of rotary member 26 is provided with a plurality of teeth 36 adapted to drivingly engage the teeth 24 provided to gear box sleeve 22. A plurality of bolt holes 38 are provided through the hub 31 of rotary member 26. The bolt holes 38 are countersunk at the surface opposite surface 35 and receive a plurality of machine bolts 39 which secure the rotary member 26 to the oppositely disposed axially facing annular surface of the sleeve 22 with the sleeve teeth 24 drivingly engaging the teeth 36 of rotary member 26.

Figure 3:
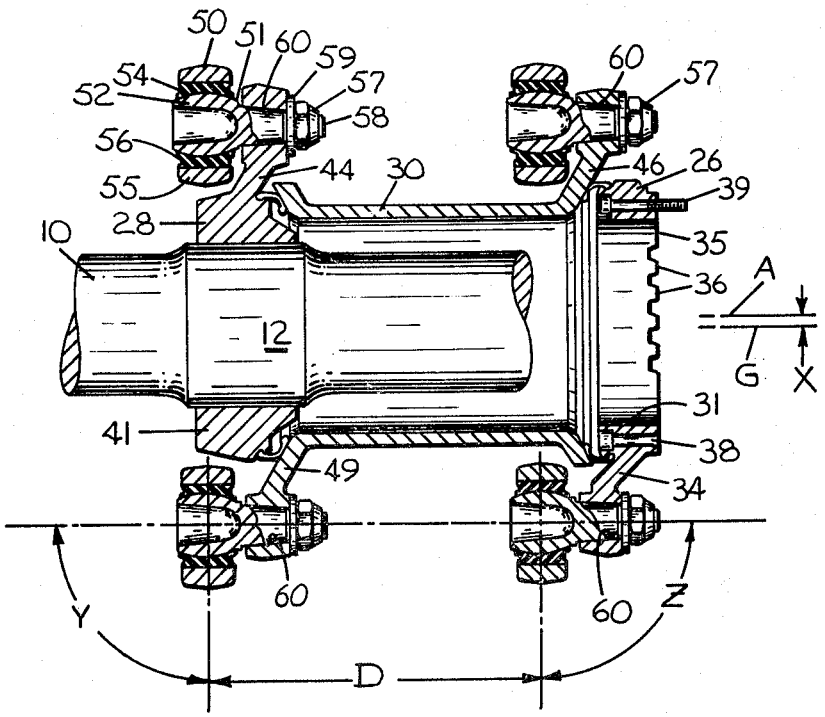
FIG. 3 is a sectional view of the coupling taken along the line 3—3 of FIG. 2.

The rotary member 28 is also formed with a hub like interior portion 41 and a flange generally in the form of oppositely disposed radially extending arms 42 and 44. The interior diameter of the hub 41 of rotary member 28 is machined to provide an interference fit with an enlarged portion 12 of the axle 10. As shown by FIG. 3 the rotary member 28 is press fit to the enlarged portion 12 of axle 10 and serves as the output driving connection from the coupling 25 to the axle 10.

The intermediate member 30 is an elongate hollow member. At one end of the intermediate member 30 is provided with a flange in the form of oppositely disposed radially extending arms 46 and 47. At its opposite end the intermediate member 30 is provided with a flange in the form of oppositely disposed radially extending arms 48 and 49.

The rotary members 26 and 28 are respectively connected each at an oppositely disposed end of the intermediate member 30 by means of a plurality of links 50 and connecting pins 51. Each link 50 is provided with a pair of connecting pins 51 which project in the same axial direction away from the link 50. Each of the connecting pins 51 are provided with a head 52 of generally spherical curvature. The head 52 of each pin 51 is seated in an elastic medium 54 compressed by a bushing 55 which in turn is press fit to an opening 56 adjacent one end of a link 50. Each pin 51 is threaded at its opposite end 58 and tapered between the head 52 and threaded end 58. The radially extending arms 32, 34, 42, 44, 46, 47, 48 and 49 are each provided with a pair of tapered openings 60. The openings 60 are tapered at an angle complementary to the taper provided to the intermediate portion of the connecting pins 51. The connecting pins 51 are each seated in one of the tapered openings 60 of the oppositely disposed radially extending arms of the rotary members 26 and 28 and the intermediate member 30 and secured by a nut 57 and washer 59. The connecting pins 51 are rigidly seated in the tapered openings 60 by the nuts 57 while the heads 52, through the elastic medium 54, are mounted for limited universal movement relative to the links 50. The links 50 and connecting pins 51 thus provide a flexible coupling that can accommodate relative movement between the members 26, 28 and 30. Such movement may be caused by displacement of the axle 10 relative to the gear box 15 due to one of the wheels hitting a bump or depression in the track.

In the event of such an occurence the axis of rotation of the axle as designated by the line A in FIG. 3 would be displaced relative to the axis of rotation of the gear box sleeve 22 as represented by the line G through a given distance represented by the letter X. The axial displacement between the axes of rotation A and G is accommodated by angular displacement of the connecting pins 51 relative to the links 50 as represented by the angles Y and Z in FIG. 3. The line identified by the letter D in FIG. 3 represents the axial distance between the centerline of the connecting links 50 and the spherical heads 52 of the pins 51 at opposite ends of the intermediate member 30. The particular arrangement of the links 50 and connecting pins 51 relative to the members 26, 28 and 30 as described above has provided for a significant increase in the axial distance D and a corresponding decrease in the angular displacement as represented by the angles Y and Z from about 7° to about 4° while maintaining the overall length of the coupling 25 within a predetermined limit. This was accomplished by forming the radially extending arms 46, 47 of intermediate member 30 to rotate in substantially the same radial plane as the radially extending arms 32, 34 of the member 26, by forming the radially extending arms 48, 49 at the other end of the member 30 to rotate in substantially the same radial plane as the radially extending arms 42, 44 of the second rotary member 28 and by positioning the links 50 on the axially outboard side of the radially extending arms at each end of the intermediate member 30. The links 50 and connecting pins 51 are assembled with both connecting pins for each link projecting from the link in the same axial direction. The links 50 connecting the rotary member 26 to the intermediate member 30 are mounted adjacent the side of the intermediate member arms 46, 47 opposite from the first rotary member 26. The links 50 and connecting pins 51 connecting the radially extending arms 48, 49 of intermediate member 30 to the rotary member 28 are likewise positioned adjacent the side of the intermediate member arms 48, 49 opposite from the first rotary member 26.

Locating the links to one side of the adjacent pairs of radially extending arms also facilitates assembly and disassembly of the coupling. With reference to FIG. 1 it may be seen that the nuts 57 may be easily withdrawn from the connecting pins 51 thereby permitting the links 50 to be removed by withdrawing the connecting pins 51 from the tapered opening 60. This is particularly important with respect to the links 50 and connecting pins 51 connecting the first rotary member 26 to the intermediate member 30 since the gear box 16 limits the amount of space available for assembly and disassembly purposes on the left or axially inbound side of the member 26 as shown by FIG. 1. The radially extending arms 46, 47 at one end of the intermediate member 30 are oriented substantially normal to the radially extending arms 48, 49 at the other end of the member 30 to provide better access for assembly and diassembly purposes.

The radially extending arms 46, 47 of the intermediate member 30 are circumferentially positioned between the adjacent radially extending arms 32, 34 of the first rotary member 26. A pair of links 50 are each secured at one end to each of the radially extending arms 46, 47 of the intermediate member 30. The links 50 are secured by the connecting pins 51 at their other ends to the adjacent radially extending arms 32, 34 of the rotary member 26. In a similar manner the radially extending arms 48, 49 at the other end of the intermediate member 30 are circumferentially positioned between the adjacent radially extending arms 42, 44 of rotary member 28 and a pair of links 50 are each secured at one end of one of the radially extending arms 48, 49 and at their other ends to the adjacent radially extending arms 42, 44 of the second rotary member 28.

The foregoing arrangement provides a dynamically balanced flexible coupling capable of transmitting torque at relatively high rotational speeds. The particular arrangement of the elements of the coupling 25 permit the axle 10 to be misaligned from or moved relative to the axis of rotation of the gear box sleeve 22 and provide a structure which is capable of rapid assembly and disassembly.

The invention may also be embodied in other specific forms without departing from the spirit or essential characteristics thereof. The foregoing description is therefore to be considered as illustrative and not restrictive, the scope of the invention being defined by the appended claims and all changes which come within the meaning and equivalency of the claims are therefore intended to be embraced thereby.

I claim:

1. A coupling for transmitting torque from a rotary driving means to a rotary driven means comprising a first member adapted to be connected to said driving means, a second member adapted to be connected to said driven means, an elongate member intermediate said first and second members and means drivingly connecting said first and second members respectively to opposite ends of said intermediate member, said *last named* means connecting at least one of said members to its respective end of said intermediate member comprising a plurality of links and connecting pins with each link having a pair of connecting pins with one end of each connecting pin seated within said link and with the pins extending in one direction away from said link with one connecting pin of each link secured adjacent its other ends to means extending radially outward from said one member and the other connecting pin secured adjacent its other end to means extending radially outward from said intermediate member.

2. The coupling defined by claim 1 wherein both of said members are connected to said intermediate member by a plurality of links and connecting pins with each link having a pair of connecting pins extending in the same direction away from said link and with one connecting pin of each link secured adjacent said other end to means extending radially outward from one of said members and the other connecting pin secured adjacent said other end to means extending radially outward from the end of said intermediate member adjacent said member.

3. The coupling defined by claim 1 wherein said means extending radially outward from said one member and from said intermediate member each comprise a pair of diametrically opposed radially extending arms and said links connecting said one member to said intermediate member are positioned adjacent the side of said intermediate member arms opposite from said one member.

4. A coupling for transmitting torque from a rotary driving means to a rotary driven means substantially axially aligned with said driving means comprising a first member adapted to be connected to the rotary driving means, a second member adapted to be connected to the rotary driven means, an elongate member intermediate said first and second members, means extending radially outward from said first and second members and from each end of said intermediate member, and means connecting said first and second members respectively to the opposite ends of said intermediate member, said connecting means comprising a plurality of links and connecting pins with each link positioned adjacent the side of said radially extending means of said intermediate member opposite from said first member and having a pair of pins with one end of each connecting pin seated within a link and with the pins extending away from said link *only* in the direction of said first member with one connecting pin of each link secured adjacent its other end to said means extending radially outward from one end of said intermediate unit and the other connecting pin secured adjacent its other end to said means extending radially outward from said first or second rotary member at that end of said intermediate member.

5. The coupling defined by claim 4 wherein said means extending radially outward from said first member and from the end of said intermediate member adjacent said first member each comprise a pair of diametrically opposed radially extending arms and a pair of said links are connected at one end to each of the radially extending arms of said first member with one of each pair of said links connected at its other end to a different radially extending arm of said intermediate member.

6. A drive axle assembly for a rail vehicle comprising a gear box including rotary output driving means, a coupling having a hollow interior and an axle extending through the interior of said coupling, a wheel at each end of said axle, said coupling comprising a first rotary member drivingly connected to said gear box output, a second rotary member drivingly connected to said axle between said wheels, an axially elongate member intermediate said first and second rotary members, radially directed extensions at each end of said intermediate member, and a plurality of links drivingly connecting each of said rotary members to an extension at one end of said intermediate member, each of said links being located on the side of its respective extension opposite from said first rotary member and including a pair of connecting pins projecting axially away from said link in the direction of said first rotary member, one of said pair of connecting pins being secured adjacent its projecting end to an extension of said intermediate member and the other of said pair of connecting pins being secured adjacent its projecting end to one of said rotary members.

7. The drive axle assembly defined by claim 6 wherein said gear box is rigidly mounted to said rail vehicle, said rotary output driving means comprises a hollow sleeve having an axially facing annular surface drivingly engaging an appositely disposed annular surface of said first rotary member and removable means securing said first rotary member to said sleeve.

8. The drive axle assembly defined by claim 7, wherein said annular surface of said rotary member includes a plurality of teeth drivingly engaging a plurality of teeth provided to said axially facing annular surface of said sleeve and said removable means comprises a plurality of machine bolts securing said first rotary member to said sleeve.

* * * * *